(12) United States Patent
Morales De La Rica et al.

(10) Patent No.: US 7,706,932 B2
(45) Date of Patent: Apr. 27, 2010

(54) METHOD FOR CONTROLLING CONTROL PARAMETERS IN AN AIR VEHICLE AND SYSTEM OF CONTROLLING AN AIR VEHICLE

(75) Inventors: Maria Jesus Morales De La Rica, Madrid (ES); Sergio De La Parra Carque, Madrid (ES); Francisco Javier Angel Martinez, Madrid (ES); Francisco José Ibañez Colás, Madrid (ES); Andrés Herrera Martin, Madrid (ES)

(73) Assignee: Instituto Nacional de Tecnica Aeroespacial "Estaban Terradas", Madrid (ES)

( * ) Notice: Subject to any disclaimer, the term of this patent is extended or adjusted under 35 U.S.C. 154(b) by 660 days.

(21) Appl. No.: 11/606,412

(22) Filed: Nov. 30, 2006

(65) Prior Publication Data

US 2008/0133069 A1    Jun. 5, 2008

(51) Int. Cl.
*G05D 1/08*    (2006.01)
(52) U.S. Cl. .......................................................... 701/4
(58) Field of Classification Search ...................... 701/4, 701/11
See application file for complete search history.

(56) References Cited

U.S. PATENT DOCUMENTS

| | | | | |
|---|---|---|---|---|
| 2,870,979 A * | 1/1959 | Tribken et al. | ................. | 244/79 |
| 3,068,706 A * | 12/1962 | Lankow | ....................... | 74/5.34 |
| 3,834,653 A * | 9/1974 | Perkel | ......................... | 244/166 |
| 3,848,833 A * | 11/1974 | Rauschelbach | ............. | 244/177 |
| 4,084,773 A * | 4/1978 | Schmidt et al. | ............. | 244/166 |
| 4,490,793 A * | 12/1984 | Miller | ............................. | 701/3 |
| 4,641,268 A * | 2/1987 | Zweifel et al. | .............. | 701/121 |
| 5,062,583 A * | 11/1991 | Lipps et al. | ................. | 244/3.15 |
| 5,213,283 A * | 5/1993 | Gold et al. | ................ | 244/17.13 |
| 5,265,826 A * | 11/1993 | Ebert et al. | ............... | 244/17.13 |
| 5,716,032 A * | 2/1998 | McIngvale | ................... | 244/185 |
| 6,041,273 A * | 3/2000 | Burken et al. | ................... | 701/3 |
| 6,062,513 A * | 5/2000 | Lambregts | ................... | 244/175 |
| 6,163,744 A | 12/2000 | Onken et al. | .................... | 701/3 |
| 6,246,929 B1 * | 6/2001 | Kaloust | ....................... | 701/11 |
| 6,493,609 B2 | 12/2002 | Johnson | ......................... | 701/3 |
| 6,567,727 B2 | 5/2003 | Westphal | ........................ | 701/4 |
| 6,711,477 B1 | 3/2004 | Johnson et al. | ................. | 701/3 |
| 6,922,618 B2 * | 7/2005 | Luo | .............................. | 701/3 |
| 7,440,825 B2 * | 10/2008 | Einthoven et al. | ............. | 701/3 |
| 7,463,956 B2 * | 12/2008 | Einthoven et al. | ............. | 701/4 |
| 2005/0004721 A1 * | 1/2005 | Einthoven et al. | ............. | 701/4 |
| 2006/0058928 A1 * | 3/2006 | Beard et al. | .................... | 701/11 |

OTHER PUBLICATIONS

International Search Report dated Jun. 10, 2005 from PCT/ES2005/000088.

* cited by examiner

*Primary Examiner*—Eric Bolda
*Assistant Examiner*—Ari M Diacou
(74) *Attorney, Agent, or Firm*—Ohlandt, Greeley, Ruggiero & Perle, L.L.P.

(57) ABSTRACT

According to the method of the invention, control parameters V indicating speed, R indicating turn characteristics and γ indicating a path angle are determined such that these parameters are maintained between limits, and such that one of them deviates as little as possible from a corresponding control input parameter Ri. In order to maintain (as much as possible) the value of R unchanged, V can be varied. The method may include the calculation of the maximum and minimum thrust available.

14 Claims, 5 Drawing Sheets

METHOD FOR CONTROLLING CONTROL PARAMETERS IN AN AIR VEHICLE AND SYSTEM OF CONTROLLING AN AIR VEHICLE

TECHNICAL FIELD OF THE INVENTION

The invention is comprised within the field of air vehicles, including unmanned air vehicles (UAV).

BACKGROUND OF THE INVENTION

The path which an air vehicle must follow during flight, the attitude (the pitch and roll) of the vehicle as well as its speed, are controlled by means of actuators associated to several elements of the vehicle, specifically to its propulsion system (the engines) and to the vehicle control surfaces. In other words, in order for the vehicle to follow a desired path with a desired attitude and speed, it is necessary to generate and send suitable control signals to the actuators, such that the actuation of the propulsion system (including the developed thrust) and the position or orientation of each control surface is suitable so that the vehicle may follow the path as desired. The generation of these signals is usually carried out by an on-board computer system of the vehicle from commands generated by a pilot (which can be on board the vehicle or which the pilot controls remotely from a land control station or a station in another vehicle) by a mission management system or by both.

FIG. 1 shows a flight control system for an air vehicle according to the state of the art. As can be seen, the system includes a mission management module 1 (which can have a stored path, for example in waypoint form, or which can receive flight instructions, for example in waypoint form, preprogrammed maneuvers, or the like, generated by a pilot 1A who may be on board the vehicle or who may transmit instructions to the vehicle from a land control station or a control station in another vehicle).

On the other hand, the flight control system comprises a navigation and guidance subsystem 2 comprising a navigation module 2A—which calculates the ground speed and position of the vehicle with respect to the Earth—and a guidance module 2B, which attempts to correct errors such that the real path and speed adapt to the desired path and speed according to the information supplied to the mission management module. To that end, the guidance module 2B usually comprises control laws, the control variables of which are the errors in the path, for example a PID (proportional, integral and derivative) control system.

The navigation and guidance subsystem receives data regarding the current vehicle conditions from the sensors 3. These sensors may include a GPS system, airspeed detectors, altitude detectors, acceleration and angular velocity detectors (for example, in the form of gyroscopes and accelerometers) as well as magnetometers (which provide a magnetic field measurement and can be used to determine the pitch and roll of the vehicle). The navigation and guidance subsystem usually does not receive the data directly from the sensors 3 but through an estimation module 4 which processes the data from the sensors and provides a series of (supposedly) processed data indicating certain flight conditions, for example the vehicle airspeed conditions, its ground speed, the roll, pitch and position of the vehicle with respect to the Earth, as well as data relating to the state of the actuators 6 controlling the propulsion system (the engines) and the vehicle control surfaces (in the event that the required sensors are arranged).

On the other hand, the flight control system comprises what is usually referred to as a primary control module 5 receiving data (d) with respect to the flight conditions from the estimation module 4, as well as control parameters (p) from the navigation and guidance module 2 (or, in some cases, directly from the mission management module 1). Said control parameters p usually comprise:
- a parameter V indicating a desired speed;
- a parameter R indicating desired turn characteristics (for example, turning radius, turning speed or angle of roll) (rotation usually relates to the rotation of the projection of the path of the vehicle in a horizontal plane); and
- a parameter $\gamma$ indicating a desired path angle (path angle is usually understood as the angle of the path of the vehicle in the vertical plane with respect to the horizontal plane).

These three parameters V, R and $\gamma$ may relate to the Earth or air; the transformation of Earth-related parameters to air-related parameters (or vice versa) can be carried out directly once the speed of the air is known.

Based on these parameters p and data d, the primary control module 5 calculates the signals s for the actuators of the vehicle: these signals determine how the control surfaces will be oriented as well as the power that the vehicle engines will provide. The state of the art includes a large number of systems and algorithms which can be used for generating the control signals (s) from the control parameters (p) and data (d) regarding the state and condition of the vehicle.

The parameters (p) which the primary control module 5 receives may include:

A) In the case of a vehicle which must "automatically" follow a predefined path or route (established, for example, by means of a series of waypoints known by a mission management system, or by means of high-level commands from a pilot):
- a desired speed of the vehicle;
- a desired path angle (i.e. the angle which the path of the vehicle follows in the vertical plane with respect to the horizontal plane); and
- a desired turning speed or turning radius for turns in the horizontal plane.

(These control parameters are calculated by the navigation and guidance subsystem 2; a large number of systems and algorithms are known in the state of the art for calculating this type of control parameters from the route data which the vehicle has and from data indicating the flight conditions, therefore it is not necessary to herein describe said systems and algorithms in further detail).

B) In the case of a vehicle flying according to basic instructions commanded by a physical pilot:
- a desired speed of the vehicle
- a desired attitude of the vehicle, i.e. its pitch and angles of roll.

For at least some of the control parameters (p), or combinations thereof, there are usually limits establishing what is usually referred to as an operational envelope and which are used to prevent the system from accepting values of the control parameters which may represent a danger, for example a reduction of the speed under a minimum speed, a turning radius which may represent excessive stress on parts of the vehicle, etc. These limits may vary over time and be a function of the current flight conditions (represented by the data provided by the sensors 3 and estimation module 4). The limits may further be interrelated, for example the envelope for the turning radius (i.e. the limits between which the turning radius may vary) may depend on the speed, etc.

In unmanned air vehicles, the paths to be followed are many times established beforehand and the mission management module 1 is responsible for generating the control parameters (p); it usually does this through the navigation and guidance subsystem although it is also possible to generate the control parameters without resorting to this subsystem.

In the system shown in FIG. 1, the control parameters can be calculated in the navigation and guidance subsystem 2 taking into consideration the real position of the vehicle with respect to a series of waypoints with the intention that the vehicle follows, in the most reliable manner possible, the originally planned path, which is appropriate for reducing the risk of accidents insofar as it is possible (and furthermore the problem represented by recalculating the routes during the flight). However, unexpected (and often unforeseeable) events often occur, for example changes in the atmospheric conditions, problems in the vehicle equipment, exits from the expected route due to an intervention by the pilot from the land station, etc., causing problems for the vehicle in following the planned path, for example for climbing with the originally planned path angle, for example due to an excess of wind in the flight direction, which would make a greater (aerodynamic) path angle necessary, the necessary power in this case possibly being greater that the available power, or due to the fact that the engines do not allow developing the originally planned power. In these cases, a conventional solution to the problem consists of recalculating the route to be followed, something which however may represent a problem given that it may require a high calculation capacity (which may exceed the capacity of the on-board systems of the vehicle) and certain risks (for example, in the case of an unmanned air vehicle, because the system generating the alternative path may not have relevant data relating to obstacles which may be present in the new path, for example mountains, civil aviation airways, etc.; on the other hand, having such data would entail a great computational cost).

Patent document U.S. Pat. No. 6,493,609 describes an automatic envelope protection system for unmanned air vehicles. Basically, an envelope protection subsystem is intercalated between a navigation system (which may basically produce a series of input control parameters calculated from the data of the expected route, for example waypoints, which the navigation system has) and a control system which must calculate the output control signals for the actuators from said input control parameters. To protect the envelopes, the protection system takes corrective actions to modify the input control parameters before they reach the system calculating the control signals for the actuators; for that purpose it is based, among others, on the data relating to the current state of the vehicle, which allows determining if the vehicle is excessively approaching the limits represented by the envelopes. The attempt is made to maintain the real vehicle conditions within certain limits, not the control parameters which are sent to the control module. The attempt is made to maintain the originally planned path, insofar as it is possible, by applying certain offsets to the actuators for a certain time such that values within the envelope are obtained. The possibility of recalculating the originally planned mission or path so as to offset the alternation of the input control parameters forced by the protection system is provided.

Patent document U.S. Pat. No. 6,711,477 describes a similar system and method for numerically determining the flight envelope. Calculation routines are contemplated which may be complex and require a high calculation capacity.

Patent document US-A-2002/0055809 describes a system in which there is a computer in parallel with the flight control computer which analyzes the risk-entailing conditions using fuzzy logic. The results of the analysis are shown to the pilot in order to take the measurements which he/she considers as appropriate.

Patent document U.S. Pat. No. 6,163,744 describes a system for modifying a flight route as a response to changes in certain parameters. In other words, the flight plan, i.e. the mission, is modified.

It is possible that at least some of the known systems can be used for preventing an air vehicle (manned or unmanned) from exiting its flight envelope. However, this is many times obtained in the known systems by recalculating the route or path to be followed, establishing an alternative route. This may involve several problems: it requires sufficient data and calculation capacity to establish a new "safe" route and/or access to a "preprogrammed" alternative route. It has been considered that it would be desirable to reduce the cases in which it is necessary to recalculate the route or choose another alternative route in order to respect the flight envelope. It has likewise been considered that it would be desirable to obtain that the vehicles substantially adapt to the planned route and that the (possibly temporary) deviations of said route (especially in the horizontal plane) are not greater than which is (strictly) necessary for maintaining the vehicle within its flight envelope. It has further been considered that it would be desirable to achieve these objectives with a system that does not require a high calculation capacity, which is performed in real time and which can be incorporated in the flight control systems already existing on the market with a basic knowledge of the vehicle models and a very small computational cost.

DESCRIPTION OF THE INVENTION

A first aspect of the invention consists of a method for controlling control parameters of an air vehicle having a propulsion system and a plurality of control surfaces configured to allow the control of the speed and of the angles of pitch and roll of the vehicle, the operation of the propulsion system and the positions of the control surfaces being controlled by means of control signals generated from data relating to the conditions of the vehicle and from control parameters comprising a parameter V indicating speed, a parameter R indicating turn characteristics (for example, turning radius, turning speed or angle of roll) of the vehicle in a horizontal plane, and a parameter $\gamma$ indicating a path angle of a path that the vehicle must follow in a vertical plane.

Like most air vehicle control methods, the method comprises the step of receiving input control parameters (for example generated by the navigation and guidance system or directly by a mission management system) including an input parameter $V_i$ indicating said speed, an input parameter $R_i$ indicating said turn characteristics, and an input parameter $\gamma_i$ indicating said path angle.

According to the invention, the method further comprises the steps of:
  establishing a lower limit V1 (which can be calculated in real time from the current vehicle conditions) and an upper limit V2 (which can also be calculated in real time or may correspond to a preset maximum for safety reasons) for the value of parameter V;
  establishing a lower limit R1 (which can be calculated in real time) and an upper limit R2 for the value of parameter R;
  establishing a lower limit $\gamma 1$ and an upper limit $\gamma 2$ for the value of parameter $\gamma$.

At least some of the values V1, V2, R1, R2, $\gamma 1$ and $\gamma 2$ can be calculated in real time from data relating to current flight conditions and from a model of the vehicle. This model of the vehicle can comprise an aerodynamic model providing the aerodynamic forces and momentums, a model of the propulsion plant providing the propulsion forces and momentums as well as fuel consumption, a model of the atmosphere providing the characteristics thereof (density, pressure, etc.) according to the altitude, and a mass model providing the weight and center of gravity of the vehicle at all times.

The estimated weight at all times can be obtained from these models, and this value can be used for calculating the limitations.

The values for the stall speed, which is a known function of weight, of the flight altitude, which comes directly from the sensors or the estimation module, and of the angle of roll or the turning radius, can also be obtained. The lower limit of speed (V1) can be a percentage of this stall speed value, such that it allows assuring that it is far enough from the same. The maximum speed value can result due to structural reasons, such as a function of the maximum allowed load factor and the current vehicle conditions or due to limitations of the propulsion plant.

The limitations for R can correspond to the structural limitation to reach the maximum load factor, in which case it is obtained from the speed, weight and flight altitude and the value of the maximum load factor, or it can result from the speed V1 for that value coinciding with the maximum speed V2. The other limiting value for R can correspond to the fact that the vehicle does not rotate in the horizontal plane. When R corresponds to the turning radius, the maximum value of R2 can correspond to an infinite turning radius, which means that the vehicle follows a straight path in the horizontal plane. If the input corresponds to another indicative parameter of rotation, such as the turning speed or angle of roll, the limits are the opposite: the minimum in absolute value is 0 when it follows a straight path and the maximum value is the one obtained from the calculations (also in absolute value).

Values obtained from a prior analysis of actions can be used or they can be calculated in real time for the value of $\gamma$. For example, for the maximum the value corresponding to speed V1, weight and current heights and maximum thrust can be used.

According to the invention, the method further comprises the steps of:

setting the value of V at a selected value such that
a) $V1 \leq$ the value of $V \leq V2$ and such that
b) it allows setting the value of $\gamma$ at a certain value which deviates as little as possible from the value of $\gamma i$;
while at the same time meets the condition $\gamma 1 \leq$ the value of $\gamma \leq \gamma 2$; and while at the same time meets the condition that said certain value of $\gamma$ is selected such that it allows setting the value of R at an "optimal" value which deviates as little as possible from the value of Ri while at the same time meets the condition $R1 \leq$ the value of $R \leq R2$;

setting the value of $\gamma$ at said certain value; and
setting the value of R at said optimal value.

The intention is to thus maintain the path in the vertical plane (its projection in the vertical plane) as similar as possible to the originally planned path, sacrificing the maintenance of the speed when needed and sacrificing the maintenance of the path in the vertical plane only when parameter V is situated at its upper or lower limit, and if it is then still necessary to adjust $\gamma$ to be able to maintain the value of R as close as possible to value Ri, without exceeding R2 and without dropping below R1, and maintaining $\gamma$ within its upper and lower limits.

The method of the invention may additionally comprise the steps of:

calculating an available minimum thrust T1 and an available maximum thrust T2, from the model of the propulsion plant and from the current vehicle conditions, such as flight altitude, speed and operating conditions of the propulsion plant;

calculating, according to current vehicle conditions, a necessary thrust T for the values of Vi, Ri and $\gamma i$, or with the modified values Vi', Ri' and $\gamma i'$ of those parameters, adapted for being within limits V1, V2, R1, R1, $\gamma 1$, $\gamma 2$;

establishing the values of V, R and $\gamma$ such that the condition $T1 \leq T \leq T2$ is met while at the same time establishing the value of R at a value which deviates as little as possible from the value of Ri while at the same time meets the condition $R1 \leq$ the value of $R \leq R2$ (and at the same time that V and $\gamma$ are maintained within their respective upper and lower limits and, preferably, with the value of $\gamma$ as close as possible to the value of $\gamma i$).

Parameters for the control module (which generates the signals for the actuators of the vehicle) are thus established, which parameters are selected according to the limits of the propulsion system.

To obtain the necessary thrust to maintain the airplane in the modified input conditions Vi', $\gamma i'$ and Ri', the models of the vehicle and the force and momentum equations defining the movement thereof as a rigid solid can be used, considering stationary conditions (such as straight and level flight without slipping or coordinated and steady turn), considering the weight, altitude and wind conditions at that time. If the thrust T thus obtained is between the corresponding maximum and minimum values which can be provided by the propulsion plant for said flight conditions (which are also calculated from the model), these values of Vi', $\gamma i'$ and Ri' are already the values which are considered optimal. If this is not the case, the values are calculated so that they coincide with the limiting values, i.e. in the event that the necessary thrust is greater than the maximum thrust, they are calculated so that both values are equal. When the necessary thrust is less than the minimum thrust, V, $\gamma$ and R are calculated so that the necessary thrust coincides with the minimum thrust. If this is possible by varying only the speed within the margin defined by V1 and V2, this value V is modified maintaining the other two values at the modified input values $\gamma i'$ and Ri'. If the limiting values are reached for the speed without the value of the necessary thrust being within the thrust limits, the speed is maintained at the limiting value (V1 or V2) and the angle of the path in the vertical plane is modified, maintaining Ri'. If the limiting values ($\gamma 1$ or $\gamma 2$) are reached without the necessary thrust being within the margin defined by the maximum and minimum thrust, the value of $\gamma$ is set at the corresponding limiting value and Ri' is modified.

The speed can thus be varied within the limits established for it (and within that allowed by the vehicle conditions, including the available thrust in the current vehicle conditions) in exchange for the purpose of being able to maintain the path as similar as possible to the originally planned path (giving "priority" to the path in the horizontal plane).

Therefore, by renouncing the exact or preprogrammed maintenance of the speed (represented by the value of the input parameter Vi), it is possible to obtain that the vehicle deviates as little as possible from the originally planned path (at least from its projection in the horizontal plane), which can be advantageous, for example, for preventing interferences with obstacles (mountains, buildings, etc.) or for assuring that the vehicle can reach a known recovery area without needing to recalculate the "mission". The method basically allows "sacrificing" the maintenance of the planned speed in exchange for maintaining insofar as it is possible the originally planned path. When the path cannot be maintained, first the maintenance of the path in the vertical plane is "sacrificed", attempting to maintain the path in the horizontal plane as close as possible to the originally planned path.

The method may additionally comprise the steps of:

determining a real airspeed Va of the vehicle;

determining a lower limit V3 and an upper limit V4 for said airspeed Va (obtaining these values V3 and V4 can be similar to obtaining V1 and V2, i.e. it is carried out based on the stall speed and the maximum value due to structural reasons; the value of V3 can be a lower percentage of the stall speed than that corresponding to the value of V2 and V4 can be a higher percentage than V3 or coincide with V3. When the real airspeed reaches a value which is outside the range of possible commanded values—between V1 and V2—it is because the speed control is not responding as it should. This could be due to atmospheric conditions, such as turbulence, gusts, etc.—or due to the fact that the value of the angle of climb or roll due to the guidance makes this unattainable, as in the case of the configuration of FIG. 3. When this occurs, it is necessary to attempt to increase the speed by changing the input parameters and the configuration of the primary controller. If departing from the range between V1 and V2 is due to an isolated event, for example a gust, when the cause disappears the speed will return to its initial value. To prevent that this type of causes are continually activating this operating mode, a wide larger margin is provided and for this reason V3 and V4 do not coincide with V1 and V2.);

establishing the values of V, R and γ such that they lead the vehicle to meeting the condition $$V3 \leq Va \leq V4$$

while at the same time establishing the value of R at a value which deviates as little as possible from the value of Ri while at the same time meets the condition R1≦the value of R≦R2 (and at the same time that V and γ are maintained within their respective upper and lower limits and, preferably, with the value of γ as close as possible to the value of γi).

Specifically if the real airspeed Va<V3 or if the real airspeed Va>V4, the values of V, R and γ are established such that they lead the vehicle to meeting the condition V3≦Va≦V4. If the originally obtained value of the real airspeed Va meets the condition V3≦Va≦V4, it is not necessary to do anything with V, R and γ.

When Va<V3, the values of V, R and γ can be established such that the condition T=T2 is met.

When Va>V4 the values of V, R and γ can be established such that the condition T=T1 is met.

It is thus prevented that the vehicle can reach speeds involving a danger for its safety. This can be especially important if the values of the parameters Vi, Ri and γi have been established taking into account an error between a real path of the vehicle and an ideal path thereof, i.e. basically, if the parameters Vi, Ri and γi have been established with the intervention of a guidance system of the vehicle.

Another aspect of the invention relates to an air vehicle control system having a propulsion system and a plurality of control surfaces configured to allow control of the pitch and roll of the vehicle, the operation of the propulsion system and the positions of the control surfaces being controllable by means of respective actuators controlled by respective output control signals of the control system, said control system comprising:

means (for example built into a mission management system of the vehicle and optionally including a navigation and guidance system) for generating from data indicating a path which the vehicle must follow values for input control parameters including an input parameter Vi indicating speed, an input parameter Ri indicating turn characteristics (for example, turning radius, turning speed or angle of roll) of the vehicle in a horizontal plane, and an input parameter γi indicating a path angle of a path which the vehicle must follow in a vertical plane; and means (corresponding to what can be referred to as the primary control module of the vehicle) for generating from the values of a parameter V indicating speed a parameter R indicating turn characteristics of the vehicle in a horizontal plane, and an input parameter γ indicating a path angle, said signals for actuators including signals for actuators on the vehicle control surfaces and signals for actuators associated to the propulsion system.

According to the invention, the system further comprises:

a parameter control module configured to calculate the values of V, R and γ from the values of Vi, Ri and γi, said parameter control module being configured for:

establishing a lower limit V1 and an upper limit V2 for the value of parameter V, a lower limit R1 and an upper limit R2 for the value of parameter R and a lower limit γ1 and an upper limit γ2 for the value of parameter γ (consistent with the description provided above);

setting the value of V at a selected value such that a) V1≦the value of V≦V2 and such that b) it allows setting the value of γ in a certain value which deviates as little as possible from the value of γi;

while at the same time meets the condition

γ1≦the value of γ≦γ2;

while at the same time meets the condition that said certain value of γ is selected such that it allows setting the value of R at an optimal value which deviates as little as possible from the value of Ri while at the same time meets the condition R1≦the value of R≦R2;

setting the value of γ at said certain value; and setting the value of R at said optimal value.

The effects and advantages of this configuration are similar to those which have been explained in relation to the description of the method.

The parameter control module can be configured to calculate at least some of the values V1, V2, R1, R2, γ1 and γ2 in real time from data relating to current vehicle conditions and from a model of the vehicle.

The parameter control module can further be configured for:

calculating an available minimum thrust T1 and an available maximum thrust T2;

calculating, according to current vehicle conditions, a necessary thrust T for a combination of values of V, R and γ (for example, starting with the values of Vi, Ri and γi, or with the version Vi', Ri' and γi' of those parameters adapted for being within the limits V1, V2, R1, R1, γ1, γ2);

establishing the values of V, R and γ such that the condition $$T1 \leq T \leq T2$$

is met
and such that the conditions related to V, R and γ indicated above are met.

The parameter control module may additionally be configured for:
determining a real airspeed Va of the vehicle;
determining a lower limit V3 and an upper limit V4 for the airspeed Va;
establishing the values of V, R and γ such that they lead the vehicle to meeting the condition $$V3 \leq Va \leq V4$$

at the same time that the values of V, R and γ are established such as that described above.

Specifically, if the real airspeed Va<V3 or if the real airspeed Va>V4, the values of V, R and γ are established such that they lead the vehicle to meeting the condition V3≦Va≦V4. If the originally obtained value of the real airspeed Va meets the condition V3≦Va≦V4, it is not necessary to do anything with V, R and γ.

When Va<V3, the values of V, R and γ can be established such that the condition T=T2 is met.

When Va>V4 the values of V, R and γ can be established such that the condition T=T1 is met.

Another aspect of the invention relates to an air vehicle comprising:
a propulsion system controlled by actuators;
a plurality of control surfaces controlled by actuators;
a control system according to that which has been described above, configured to provide control signals to said actuators according to the values of the parameters V, R and γ.

Another aspect relates to a computer program comprising a program code configured to carry out the method according to the invention when the program is run in a computer. The program can be stored in a carrier, for example in a magnetic, optical or electronic carrier, or it can be modulated on an electrical or electromagnetic signal.

DESCRIPTION OF THE DRAWINGS

To complement the description being given and for the purpose of aiding to better understand the features of the invention according to preferred embodiments thereof, a series of drawings is attached as an integral part of said description which show the following with an illustrative and non-limiting character.

PREFERRED EMBODIMENT OF THE INVENTION

Figure 1:
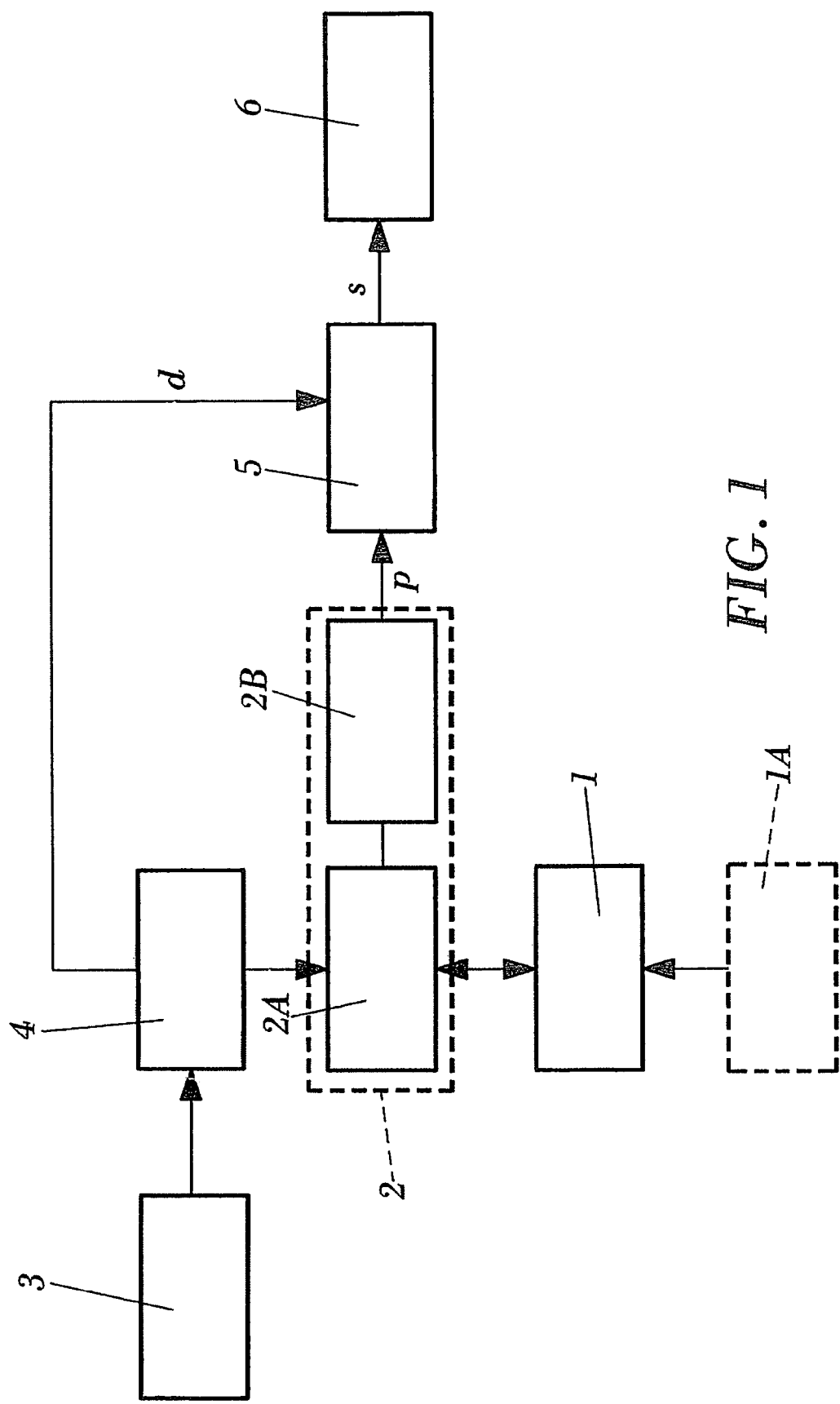
FIG. 1 shows a block diagram of an air vehicle control system according to the state of the art.
Figure 2:
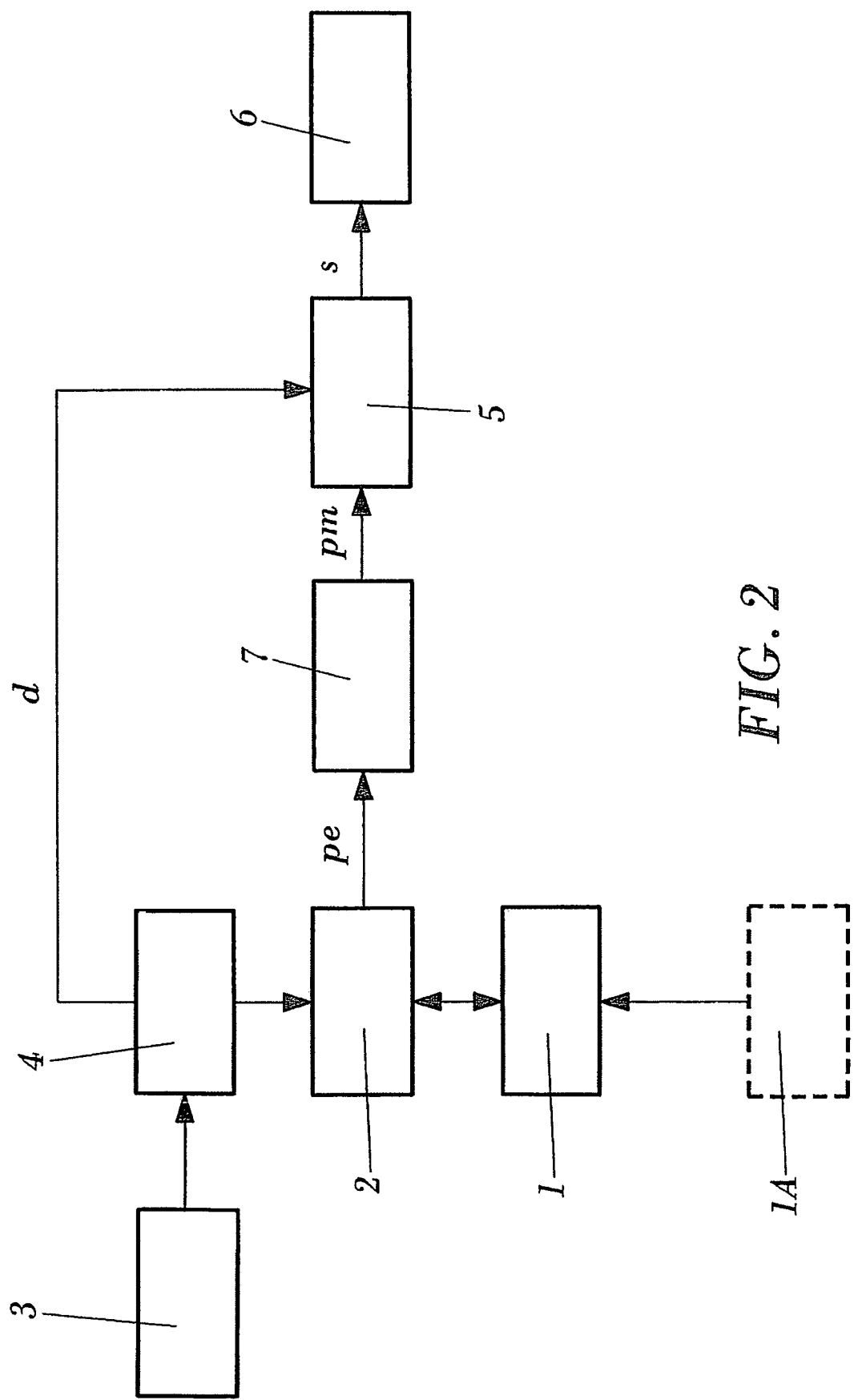
FIG. 2 shows a block diagram of an air vehicle control system according to a preferred embodiment of the invention.
Figure 3:
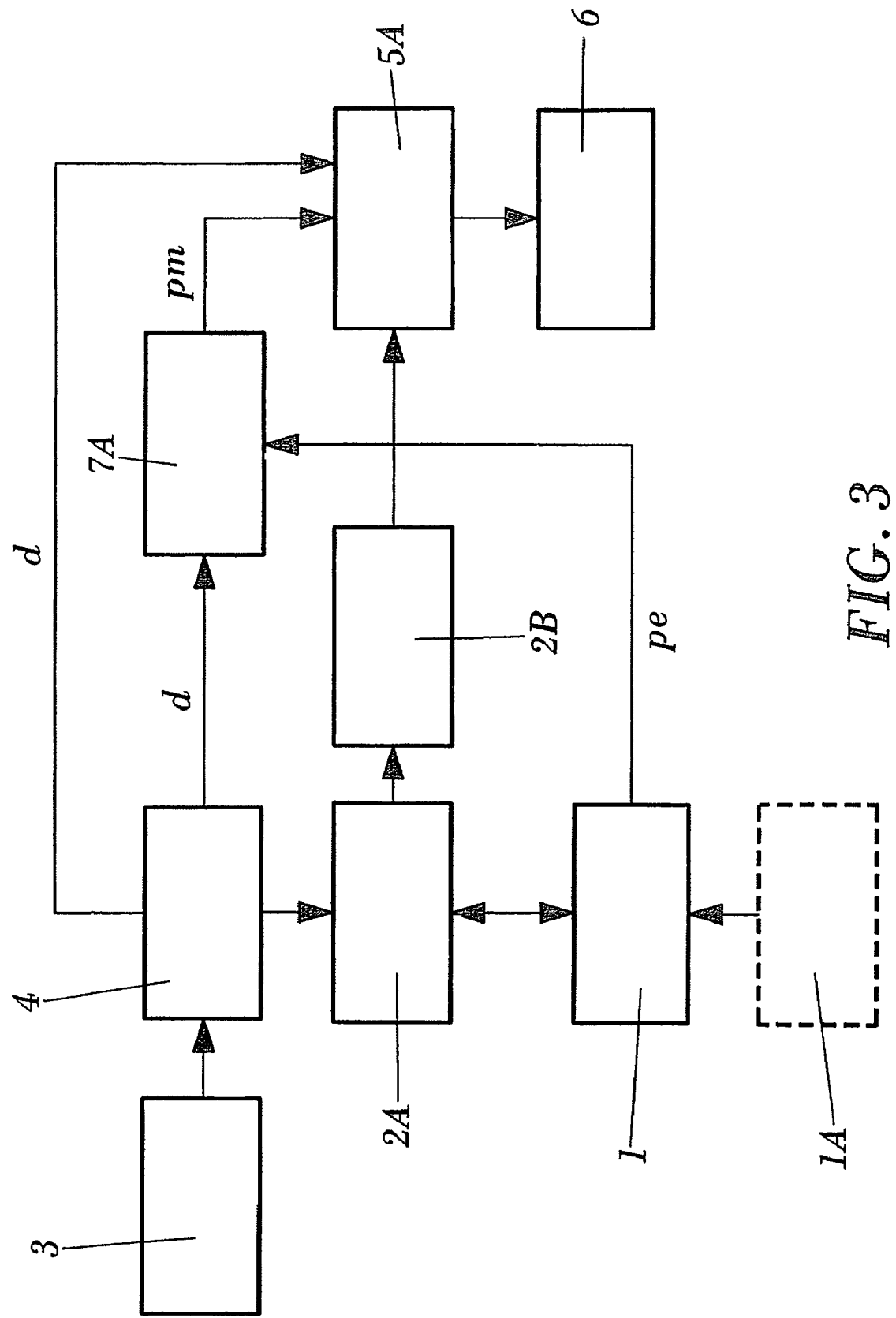
FIG. 3 shows a block diagram of an air vehicle control system according to another preferred embodiment of the invention.

FIGS. 2 and 3 show two preferred embodiments of the invention, comprising the same elements as the conventional system shown in FIG. 1 (the elements that the invention has in common with the system of FIG. 1 have the same reference numbers and will not be herein described again), although in the case of the system of FIG. 3, control module 5A differs somewhat from control module 5 because it receives parameters which have not gone through the subnavigation system integrated in the navigation and guidance modules; in contrast control module 5A receives correction data from said guidance module which will be used to modify in control module 5A itself the control parameters which said control module 5A receives from the parameter control module 7A. It could be said that the parameters pm which said control module 5A receives are the parameters corresponding to a vehicle supposedly following the desired path perfectly. The corrections of the guidance module 2B go directly to control module 5A as increments on the parameters pm.

According to both preferred embodiments of the invention, the system produces input parameters (pi) in the subcontrol and guidance system (2; 2A and 2B) or directly in the mission management module (1), which are sent to the control module (5; 5A). These parameters are input parameters (pi) received in a parameter control module (7; 7A), the function of which is to control said parameters such that the flight follows the path in the best way possible, especially in (its projection in) the horizontal plane, which can be important for being able to assure the correct recovery of an unmanned air vehicle, for example.

The input control parameters pi received at the input of the parameter control module (7; 7A) can be as follows:
an input parameter Vi indicating speed;
an input parameter Ri indicating turn characteristics (for example, turning radius, turning speed or angle of roll) of the vehicle in a horizontal plane; and
an input parameter γi indicating a path angle of a path which the vehicle must follow in a vertical plane.

Usually, these parameters (especially the parameter relating to speed) are parameters relating to the Earth given that the parameters are generated so that the vehicle follows a path with respect to the Earth. However, the signals sent to the actuators must define the aerodynamic behavior of the vehicle. The control system of the vehicle itself may do the necessary conversions given that, as a result of the data received by the sensors 3, it knows both the airspeed of the vehicle and its speed with respect to the Earth.

The parameter control module (7; 7A) comprises a modified parameter (pm) calculation subsystem which modified parameters are those which will be supplied to the control module (5, 5A), which will calculate the signals (s) for the actuators 6 of the vehicle. These modified parameters (V, R and γ) correspond to the input parameters but with values recalculated by the parameter control module (7; 7A).

To that end, the subsystem has a model of the vehicle. This model can comprise an aerodynamic model, providing the aerodynamic forces and momentums, a mass model, providing the weight and position of the center of gravity and the momentums of inertia at all times, a model of the propulsion system, providing the propulsion forces and momentums, a model of the atmosphere, providing the characteristics thereof (density, pressure, etc.) according to the altitude and the equations of forces and momentums describing the movement of the vehicle as a rigid solid; these models can be stationary given that it involves checking if the input flight conditions correspond to an equilibrium position, and it is possible that aerodynamic aspects are not taken into consideration. In a typical case, for example, the model of the propulsion system allows calculating the thrust (T) as a function of a series of parameters of the vehicle, including its speed, height, the revolutions of the engine, the position of the actuator thereof and the temperature, it also allows obtaining the consumption of fuel, which will be used in the mass model for calculating the weight and position of the center of gravity. A typical aerodynamic model allows calculating the aerodynamic coefficients according to the angles of attack and sideslip, the airspeed, the angular velocities of the vehicle, and the deflections of the control surfaces. A typical model comprises 3 equations of force defining the movement of the center of gravity of the vehicle and 3 equations of momentums defining the rotation with respect to fixed axes the origin of which is the center of gravity. In these equations, the following simplifications are made as they are stationary conditions: the speed, both airspeed and ground speed, and the parameters Ri and γi are constant (its variation with respect to time is zero), the angle of side-slip is considered null and void. With these hypotheses, a simplified system of equations is obtained from which the necessary thrust for maintaining the flight conditions defined by the input control parameters can be obtained. The equations and the atmosphere, aerodynamic, mass models, etc., are known by any person with average skills in the art, therefore it is not necessary to describe them herein in further detail.

Figure 4:
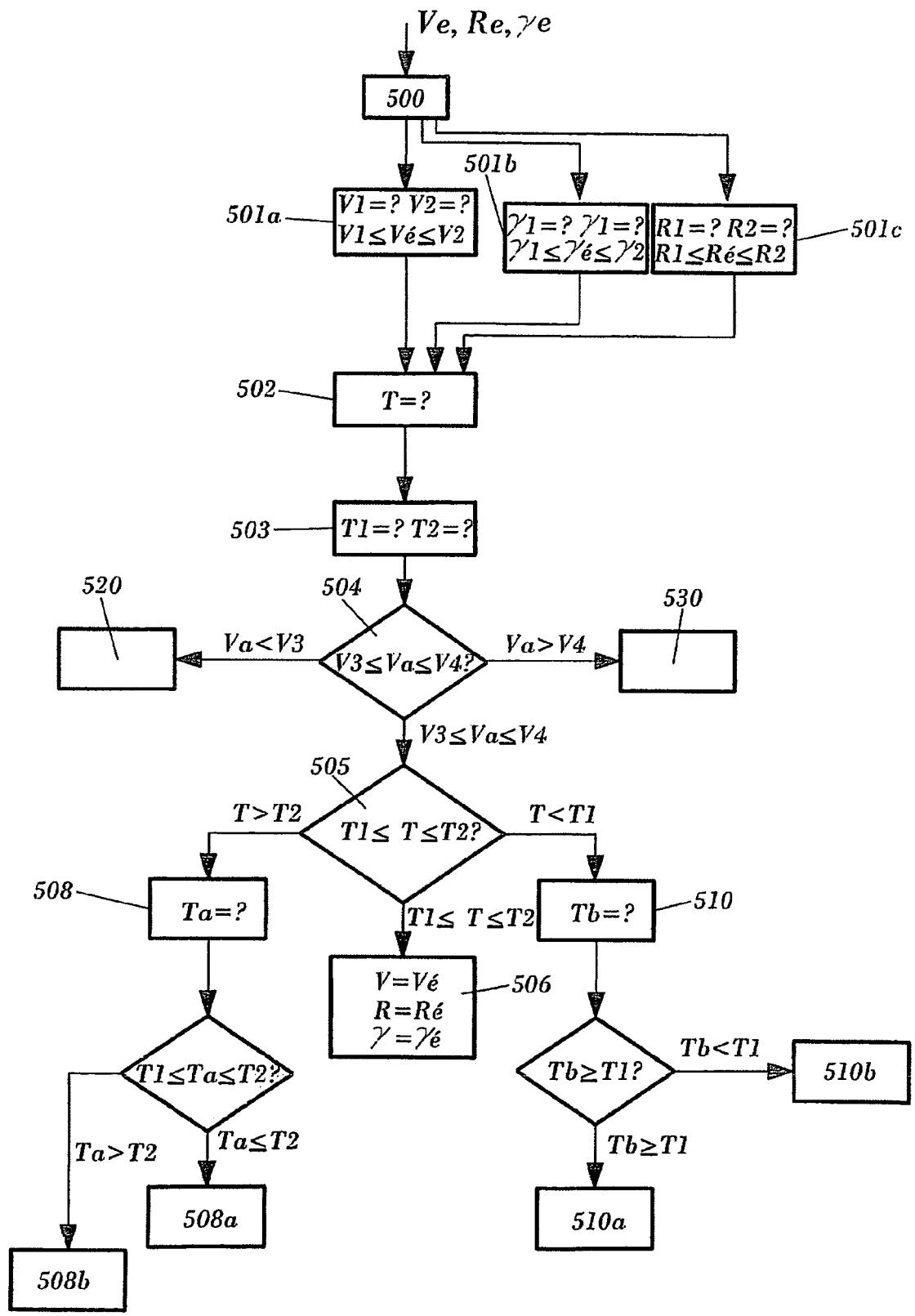
FIG. 4 shows a flowchart schematically reflecting the process according to a preferred embodiment of the invention.

FIG. 4 reflects the processes taking place each time the parameter control module (7; 7A) receives 500 the input parameters pi (namely: Vi, Ri and γi). Specifically, it is calculated if, according to the available models, the values of the input parameters (Vi, Ri and γi) can be reached according to the following steps:

First, the basic limitations of the input parameters are calculated:

501a: A minimum allowable speed V1 (which is a function of the stall speed) is determined for the conditions (height and weight) at that time and for the parameters Ri and γi. On the other hand, a maximum allowable speed value V2 is determined (this maximum value can be a set value established at a safe value from the structural point of view, or a function of the maximum allowed load factor and of the current vehicle conditions, or applying a margin of limitations of the propulsion plant). It is checked that $$V1 \leq Vi \leq V2.$$

In the event that Vi<V1, it is established that Vi'=V1; in the event that Vi>V2, it is established that Vi'=V2. If $$V1 \leq Vi \leq V2,$$

it is established that Vi'=Vi.

In other words, the value of the input parameter Vi is "adapted" such that a parameter Vi' is obtained which is maximally adjusted to Vi but which meets the condition $$V1 \leq Vi' \leq V2.$$

501b: Set minimum γ1 and maximum γ2 values which are very broad and established beforehand (which can basically be used to reject completely absurd values) or maximum and minimum values obtained from a prior analysis of the actions of the vehicle can be used for the path angle (γ). Similarly to what occurs with parameter Vi, γi is also adjusted, by definition, namely, it is checked that $$\gamma1 \leq \gamma i \leq \gamma2.$$

In the event that γi<γ1, it is established that γi'=γ1; in the event that γi>γ2, it is established that γi'=γ2. If $$\gamma1 \leq \gamma i \leq \gamma2,$$

it is established that γi'=γi.

In other words the value of the input parameter γi is "adapted" such that a parameter γi' is obtained which maximally adjusts to γi but which meets the condition $$\gamma1 \leq \gamma i' \leq \gamma2.$$

501c: As regards the parameter R the lesser of the following values can be used as a lower limit R1: the value corresponding to the maximum allowed angle of roll (which can be a set value) or the value making V1=V2. The upper limit R2 can be infinite (corresponding to a flight without turn in the horizontal plane, in the event that the input parameter Ri represents the turning radius in the horizontal plane; if another parameter is involved indicating the turn, the limits are different). Similarly to what occurs with parameter Vi, Ri is also adjusted, by definition: it is checked that R1≦Ri≦R2. In the event that Ri<R1, it is established that Ri'=R1; in the event that Ri>R2, it is established that Ri'=R2. If $$R1 \leq Ri \leq R2, \text{ it is established that Ri'=Ri.}$$

In other words the value of the input parameter Ri is "adapted" such that a parameter Ri' is obtained which maximally adjusts to Ri but which meets the condition $$R1 \leq Ri' \leq R2.$$

502: The necessary thrust T for maintaining a flight determined by Vi', Ri' and γi' (i.e. at Vi, Ri and γi, although limited by the established minimum and maximum values) in the current conditions is calculated.

503: The values of minimum thrust T1 and maximum thrust T2 which the propulsion system may provide in the current conditions and for the flight conditions determined by the input parameters Vi', Ri' and γi' are obtained from the model of the propulsion system.

504: It is checked that the airspeed (Va) of the vehicle (its "real speed") is not below a minimum value V3 (this value is also calculated in real time according to the stall speed at that time). It is likewise checked that it is not above a maximum value V4 (greater than or equal to V2).

After this point they follow different paths according to if Va<V3, V3≦Va≦V4, or Va>V4.

If V3≦Va≦V4:

505: It is checked if the necessary thrust T is between the maximum T2 and minimum T1 values (i.e. if it meets the condition T1≦T≦T2).

506: If this condition is met, the flight conditions can be reached and a set of modified parameters (pm) is provided to the control module (5; 5A), said parameters comprising:

a parameter V indicating speed, V=Vi' a parameter R indicating turn characteristics of the vehicle in a horizontal plane, R=Ri' an input parameter γ indicating a path angle of a path which the vehicle must follow in a vertical plane, γ=γi'.

508: In the case in which the necessary thrust is greater than the maximum thrust (T>T2) (this generally corresponds to high speed cruising or climbs), is calculated if there is a thrust for which R=Ri' and γ=γi' could be maintained with V1≦V≦V2. This can be done by checking if there is a thrust Ta which would allow flying at the minimum allowed speed V1 (previously calculated according to the stall speed) maintaining R=Ri' and γ=γi'.

508a: If this thrust Ta is less than or equal to the maximum but greater than the minimum (T1≦Ta≦T2), it is known that there is a speed value V for which the necessary thrust is equal to the maximum thrust T2. The value of this parameter V(T=T2) is calculated and this value of parameter V is passed to the control module (5; 5A), together with R=Ri' and γ=γi'.

508b: In contrast, if this thrust Ta is greater than the maximum (Ta>T2) it will not be possible to maintain the path and the turning radius for any safe speed, therefore, both the minimum speed value is used (it is established that V=V1) and the path angle is reduced maintaining the turning speed, i.e. γ is established such that R=Ri' can be maintained. If this is impossible (given that it would be necessary for that purpose to establish a value of γ less than γ1 or greater than γ2), it is established that γ=γ1 or γ=γ2 (the limit is chosen which allows that R deviates as little as possible from Ri') and a corresponding value of R is established, procuring that it deviates as little as possible from Ri'.

510: In the opposite case, i.e. if T<T1 (this condition usually corresponds to descents), the flight conditions are modified such that the necessary thrust is equal to the minimum thrust (T=T1). The turning speed in this case is not modified given that increasing said turning speed makes no sense given that in the case of being commanded to follow a straight path, i.e. null turning speed (the necessary thrust is increased so that it coincides with the minimum thrust respecting the horizontal path as much as possible, to increase the thrust V or γ can be increased or R can be decreased; it can always be obtained with the first two), the vehicle could make a turn. To that end, for example, the necessary thrust Tb for maintaining the path angle γ=γi' and the turning speed R=Ri' to fly at the maximum speed V=V2 can be calculated.

510a: If this value Tb is greater than or equal to the minimum (if Tb≧T1), it is understood that there is a speed parameter V for which the necessary thrust T is equal to the minimum thrust, i.e. T=T1. This parameter V is calculated and is passed to the control module (5; 5A) together with γ=γi' and R=Ri'.

510b: In contrast, if Tb<T1, there is no allowed speed parameter V for which the path angle parameter γ=γi' can be maintained. Therefore, the maximum speed parameter value is maintained (it is established that V=V2) and the path angle (γ) is reduced to that which is calculated from this speed (V2) and the minimum thrust (T1). The parameters V=V2, R=Ri' and calculated value of γ are passed to the control module (5; 5A).

If Va<V3:

520: If the airspeed is under the minimum value V3 (Va<V3), it is considered that the thrust must be the maximum thrust (given that the speed is approaching the stall speed and it is appropriate to increase it as quickly as possible), i.e. T=T2. In such case the speed parameter V can be maintained at the minimum value V1 plus an increment dV', such that it is assured that the speed increases above value V3; the turning speed parameter R=Ri' is also maintained. From this data, an angle parameter value γ for which said conditions are met can be calculated. These parameters are supplied to the control module (5, 5A). For greater safety, it is appropriate to complete the system with a pitch speed control and to allow an increase of the errors in the vertical path (given that this decrease in speed is generally due to the fact that the path angle is high). The speed at which this pitch speed control system would start operating could be less than or equal to V3 (if the reduction of speed is small, it may only be resolved with the maximum thrust; if this is not the case and it keeps decreasing, other measures such as pitch speed control must be adopted) and it can be established that in order to leave this mode, parameter V must reach the value of V1 (so as to prevent that if the cause which produced the reduction of speed continues, it does not immediately return to this mode).

If Va>V4:

530: In contrast, if the airspeed exceeds the maximum value (Va>V4), the thrust can be maintained at the minimum (T=T1), and the speed parameter V can be set at its maximum (V=V2) minus an increment dV" (as in the previous case so as to attempt that the speed is less than V4 as soon as possible). The parameter relating to the turning speed R can be fixed at its input value Ri'. The corresponding value of γ is calculated from that point. It does not leave this mode until the real speed is less than V2. In this case it must also have a pitch speed control system (so as to allow reducing the condition of maintaining the vertical path).

At the same time, an estimate of the consumed fuel and therefore of the weight and position of the center of gravity of the vehicle is available at all times from the mass mode and the propulsion system so as to be able to update all the parameters depending on them.

Parameter control module 7 can be located between navigation and guidance module 2 and control module 5, as shown in FIG. 2. It is also possible to locate the parameter control module 7A between the mission management module 1 and control module 5A, guidance module 2B being parallel, as shown in FIG. 3. In both cases, the control module (5; 5A) receives the control parameters (V, R and γ) from the parameter control module (7; 7A). In the first case, said parameters have already taken into consideration the path error correction calculated by the navigation and guidance module. In the second case, parameters V, R and γ have been calculated assuming that the vehicle perfectly follows the path established in the mission management module 1, and correction data is received in control module 5A itself from guidance module 2B. The control module (5; 5A) also receives data from the estimation module 4 (or directly from the sensors 3).

The parameter control module (7; 7A) can function in the same way independently of the origin of the input parameters Ri, Vi and γi. In other words this module is also applicable to systems in which the inputs are from, for example, a basic piloting, i.e. from a pilot directly commanding the angles and speed.

Figure 5:
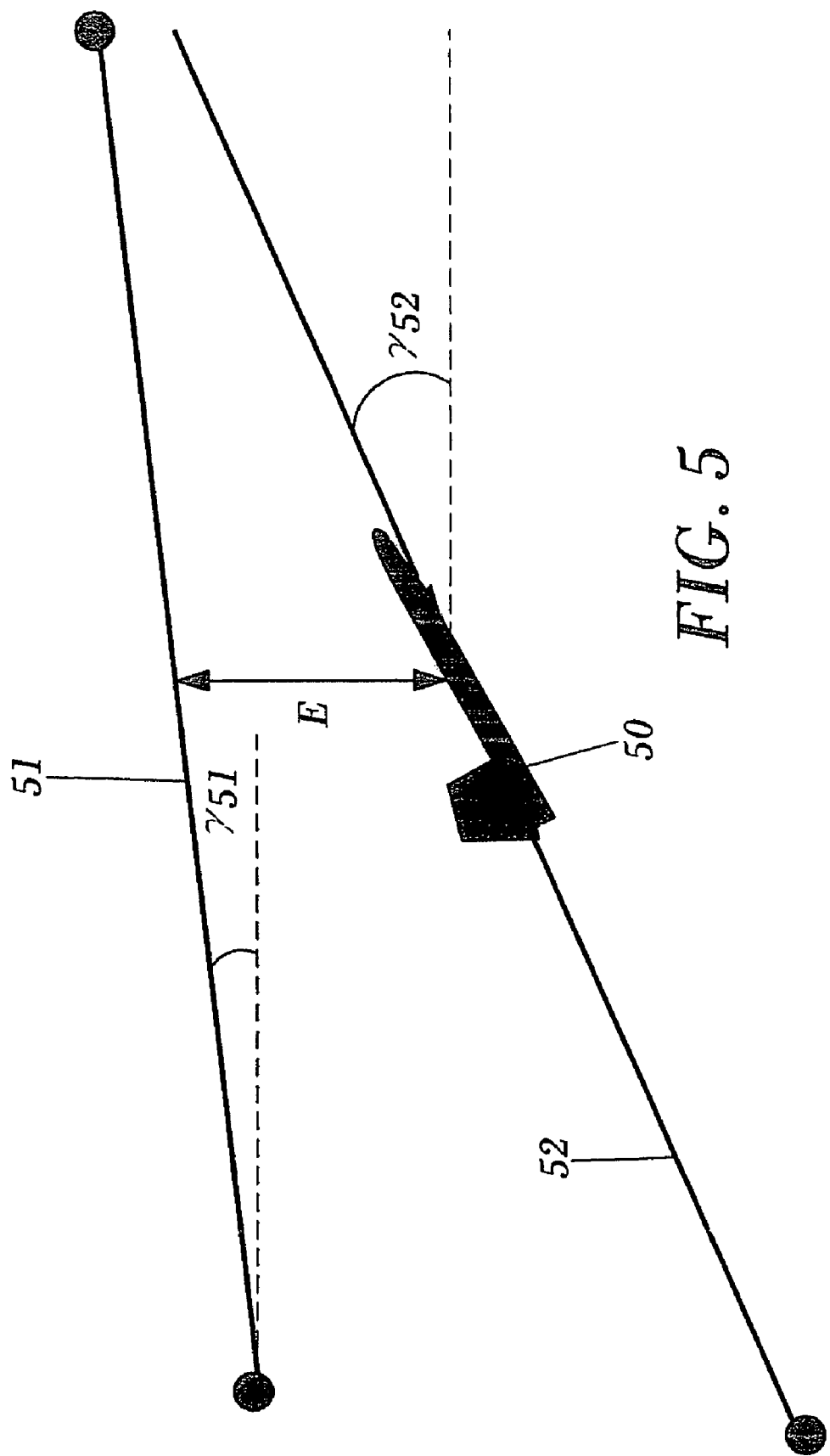
FIG. 5 schematically shows the correction of the path angle for correcting the error between the real path and the established path in the mission management module.

FIG. 5 shows a vehicle 50 programmed to follow a path 51 (generated by the mission management module) but which, due to the circumstances, has deviated from said path and is at a lower altitude that the desired altitude. The path error (in altitude) is E.

The planned path angle for path 51 is γ51. However, to reduce the error, the guidance module calculates a modified path angle γ52 corresponding to the real path which the vehicle must follow so as to approach the planned path 51. In the event that the parameter control module 7 is located after the navigation and guidance module 2, the input parameter γi corresponds to γ52; in the event that the parameter control module is parallel with the guidance module 2B, the input parameter γi corresponds to γ51; then an additional modification of parameter γ must be produced in the control module 5A itself which control module 5A receives from the parameter control module 7A, which may complicate control. However, if the output signals of the control module represent a path angle outside the recommended path angle, it will represent a change in airspeed, which will be taken into consideration by parameter control module 7A, as has been explained above.

In this text, the word "comprises" and variants thereof (such as "comprising", etc.) should not be interpreted in an exclusive manner, i.e. they do not exclude the possibility that the description may include other elements, steps, etc.

On the other hand, the invention is not limited to the specific embodiments that have been described, but they also encompass, for example, the variants which may be carried out by the person with average skills in the art (for example as regards the choice of materials, sizes, components, configuration, etc.), within the content of the claims.

The invention claimed is:

1. A method for controlling control parameters of an air vehicle having a propulsion system and a plurality of control surfaces configured to allow pitch and roll control of the vehicle, the operation of the propulsion system and the positions of the control surfaces being controlled by means of control signals which are generated from data relating to the conditions of the vehicle and from control parameters comprising a parameter V indicating speed, a parameter R indicating turn characteristics of the vehicle in a horizontal plane, and a parameter γ indicating a path angle of a path which the vehicle must follow in a vertical plane;

the method comprising the step of receiving input control parameters including an input parameter Vi indicating said speed, an input parameter Ri indicating said turn characteristics, and an input parameter γi indicating said path angle;

characterized in that the method further comprises the steps of:

establishing a lower limit V1 and an upper limit V2 for the value of parameter V, establishing a lower limit γ1 and an upper limit γ2 for the value of parameter γ, and establishing a lower limit R1 and an upper limit R2 for the value of parameter R;

setting the value of V at a selected value such that a) V1≦the value of V≦V2 and such that b) it allows setting the value of γ at a certain value which deviates as little as possible from the value of γi while at the same time meets the condition γ1≦the value of γ≦γ2, c) and such that it allows setting the value of R at an optimal value which deviates as little as possible from the value of Ri while at the same time meets the condition R1≦the value of R≦R2;

setting the value of γ at said certain value;
setting the value of R at said optimal value.

2. A method according to claim 1, characterized in that at least some of the values V1, V2, R1, R2, γ1 and γ2 are calculated in real time from data relating to current flight conditions and from a model of the vehicle.

3. A method according to claim 1, characterized in that if further comprises the steps of:

calculating an available minimum thrust T1 and an available maximum thrust T2 for the current flight conditions and from a model of the vehicle;

calculating, according to said current flight conditions and from the model of the vehicle, a necessary thrust T for a combination of values of V, R and γ;

establishing the values of V, R and γ such that the condition

T1≦T≦T2 is met.

4. A method according to claim 1, characterized in that it additionally comprises the steps of:

obtaining a real airspeed Va of the vehicle;
determining a lower limit V3 and an upper limit V4 for the airspeed Va;

if the real airspeed Va<V3 or if the real airspeed Va>V4, establishing the values of V, R and γ such that they lead the vehicle to meeting the condition V3≦Va≦V4.

5. A method according to claim 4, characterized in that when the real airspeed Va<V3, the values of V, R and γ are established such that the condition

T=T2 is met.

6. A method according to claim 4, characterized in that when the real airspeed Va>V4, the values of V, R and γ are established such that the condition

T=T1 is met.

7. An air vehicle control system having a propulsion system and a plurality of control surfaces configured to allow pitch and roll control of the vehicle, the operation of the propulsion system and the positions of the control surfaces being controllable by means of respective actuators controlled by respective output control signals of the control system, said control system comprising:

means for generating from data indicating a path which the vehicle must follow, values for input control parameters including an input parameter Vi indicating speed, an input parameter Ri indicating turn characteristics of the vehicle in a horizontal plane, and an input parameter γi indicating a path angle of a path which the vehicle must follow in a vertical plane;

means for generating from the values of a parameter V indicating speed, a parameter R indicating turn characteristics of the vehicle in a horizontal plane, and an input parameter γ indicating a path angle, said signals for actuators, including signals for actuators on the vehicle control surfaces and signals for actuators associated to the propulsion system;

characterized in that it further comprises a parameter control module configured to calculate the values of V, R and γ from the values of Vi, Ri and γi, said parameter control module being configured for:

establishing a lower limit V1 and an upper limit V2 for the value of parameter V, and a lower limit R1 and an upper limit R2 for the value of parameter R, and a lower limit γ1 and an upper limit γ2 for the value of parameter γ;

setting the value of V at a selected value such that a) V1≦the value of V≦V2;

b) it allows setting the value of γ at a certain value which deviates as little as possible from the value of γi while at the same time meets the condition γ1≦the value of γ≦γ2, c) and such that it allows setting the value of R at an optimal value which deviates as little as possible from the value of Ri while at the same time meets the condition R1≦the value of R≦R2;

setting the value of γ at said certain value;
setting the value of R at said optimal value.

8. A system according to claim 7, characterized in that the parameter control module is configured to calculate at least some of the values V1, V2, R1, R2, γ1 and γ2 in real time from data relating to current flight conditions and from a model of the vehicle.

9. A system according to claim 7, characterized in that the parameter control module is further configured for:

calculating an available minimum thrust T1 and an available maximum thrust T2 for the current flight conditions and a model of the vehicle;

calculating, according to the current flight conditions and the model of the vehicle, a necessary thrust T for a combination of values of V, R and γ; establishing the values of V, R and γ such that the condition $$T1 \leq T \leq T2$$

is met.

10. A system according to claim 7, characterized in that the parameter control module is additionally configured for:

obtaining a real airspeed Va of the vehicle;

determining a lower limit V3 and an upper limit V4 for said airspeed Va;

if the real airspeed Va<V3 or if the real airspeed Va >V4, establishing the values of V, R and γ such that they lead the vehicle to meeting the condition $$V3 \leq Va \leq V4.$$

11. A system according to claim 10, characterized in that the parameter control module is configured such that when the real airspeed Va<V3, the values of V, R and γ are established such that the condition $$T=T2$$

is met.

12. A system according to claim 10, characterized in that the parameter control module is configured such that when the real airspeed Va>V4, the values of V, R and γ are established such that the condition $$T=T1$$

is met.

13. An air vehicle comprising:

a propulsion system controlled by actuators;

a plurality of control surfaces controlled by actuators;

a control system according to claim 7, configured to provide control signals to said actuators according to the values of the parameters V, R and γ.

14. A computer with a program stored on a computer readable carrier, the program configured to carry out the method of claim 1 when run on said computer.

* * * * *